United States Patent Office 2,769,700
Patented Nov. 6, 1956

2,769,700

ONE-STAGE RESIN BONDED DIAMOND ABRASIVE WHEEL

George J. Goepfert, St. Marys, Pa., assignor to The Carborundum Company, Niagara Falls, N. Y., a corporation of Delaware No Drawing. Application January 21, 1953,
Serial No. 332,499

6 Claims. (Cl. 51—298)

This invention relates to diamond abrasive wheels bonded with an alkaline earth-catalyzed one-step phenol-formaldehyde resin.

Because of the very high cost of diamonds, diamond grinding wheels are commonly made by molding a diamond-containing portion of relatively small volume to a supporting core or backing. It is customary to preform the core or backing and then mold the diamond-containing portion onto the backing and finally cure the bonds of the composite article thus prepared. Methods and apparatus for making such articles are well known in the art and are described in numerous patents.

To the best of my knowledge the resin bond of resin bonded diamond wheels heretofore made has always been the conventional two-step phenol-formaldehyde resin. As is well known, the first phenol-formaldehyde resins were made by reacting phenol and formaldehyde in the presence of an alkali catalyst and in proportions to provide an end product which was infusible and insoluble. A few years after the original "one-step" process for making such resins was discovered it was found that a much more satisfactory process for making these resins consisted in reacting phenol with formaldehyde in such proportions that there was not sufficient formaldehyde to convert the resin to the infusible insoluble condition. In this so-called "two-step" process the materials were first reacted to form a permanently fusible solid resin (commonly called a "novolak") in the so-called solid "A stage." This resin was then powdered and mixed with hexamethylenetetramine (commonly called "hexa") in proportions to supply the additional formaldehyde which was required to convert the resin to the ultimate infusible and insoluble or "C stage" resin.

(For a brief description of the difference between one-step or one-stage and two-step or two-stage resins see page 73 of "Phenolic Resins" by Robitschek and Lewin, published in 1950 for "British Plastics" by Iliffe & Sons, Ltd. of London, England.)

In attempting to make a one-step resin great difficulty is experienced because of the fact that the reaction is exothermic. When the resin has been advanced to the point where it would normally be solid at room temperature it is very difficult, when the conventional alkali catalyst is used, to control the reaction and prevent it from continuing in the reacting vessel to the final or "C" stage. For that reason the usual commercial powdered phenol-formaldehyde resin of the past twenty-five or thirty years has been a two-step resin and these are the resins which have, so far as I am aware, previously been employed in making resin bonded abrasive articles such as the conventional grinding wheels and the more recently developed diamond wheels in which the abrasive material is diamond particles.

Although resin bonded diamond wheels have been very satisfactory and have been sold in tremendous quantities, there has been a need for increasing the efficiency of such wheels, both because of the very high cost of the diamond particles and, for the past several years, because of the scarcity of these industrial diamonds.

Accordingly, one of the objects of the present invention is to provide a diamond grinding wheel and method of making such wheel in which the resinous constituent of the bond consists essentially of a one-step phenol-formaldehyde condensation product. Another object of the invention is to provide a resin bonded diamond grinding wheel having a grinding efficiency very materially greater than that of such wheels made according to the practices of the prior art. Still another object of the invention is to provide a resin bonded diamond wheel and method of making such wheel in which the resinous constituent of the bond is formed by initially reacting phenol and formaldehyde in proportions to form an infusible resin in the presence of a nitrogen-containing catalyst and completing the conversion of the resin from the "A" stage to the "C" stage in the presence of an alkaline earth oxide catalyst. Further objects of the invention will be apparent from a consideration of the description hereinafter made.

I have discovered that the grinding efficiency of resin bonded diamond wheels can be approximately doubled by employing as the resin bond a particular type of one-step phenol-formaldehyde resin. For example, I have been able to make wheels with these resins which contained only one-half as many diamonds as have been used in the conventional wheels made with the two-step resin and have found that my improved wheels cut at substantially the same rate and removes substantially the same amount of materials before they are worn out as the conventional wheels made with the two-step resin.

In making my improved wheels I employ the practices and procedures which have previously been used in the manufacture of resin bonded diamond wheels and make my wheels in the same forms and on the same types of backings as have been used in the past. The real distinction between my invention and the prior art resides in the particular resin employed as the bond. In describing my invention it will therefore be understood that it may be applied to any of the forms and structures of the prior art.

In making the resin which is the feature of my invention I react phenol and formaldehyde in the ratio of approximately 1 mol of phenol to 1½ mols of formaldehyde. This ratio may be varied within the range of 1:1 to about 1:1.7, the ratio of 1:1.5 being entirely satisfactory.

While it is possible to prepare the resin by reacting the phenol and formaldehyde in the presence of the particular catalyst which is also an important part of my invention, when such catalyst is employed there is some likelihood of the reaction getting out of control and continuing to the ultimate "C" stage and I therefore prefer to carry out the first part of the reaction in the presence of a milder catalyst. Specifically, I initially react the phenol and formaldehyde in the presence of a nitrogen-containing base such as ammonium hydroxide or an amine, carrying the reaction to the stage where a resin which is solid at ordinary room temperatures is obtained and I then grind this resin with the alkaline earth catalyst which is employed to convert the partially reacted or "A" stage resin to the final infusible insoluble "C" stage.

The procedure in carrying out the reaction is more or less conventional. For example, it may be carried to approximately the end stage desired for the original solid resin and the water which is formed during the reaction may then be removed by vacuum distillation. Alternatively, another procedure which is common in the resin art is to react until two definite layers are formed, one of which is water and the other a mixture of the reaction product with water, and the water layer may be decanted, the remaining water which is mixed with the liquid resin being removed under vacuum as in the other procedure.

Having reacted the resin to the point where it would be solid at ordinary temperatures, I remove the resin and grind it to an extent that it will all pass through a 100 mesh and approximately 80% will pass through a 200 mesh screen. The powdered resin is then ball milled with the catalyst, which is preferably CaO or a mixture of CaO and MgO. This resin may be used in the manufacture of the diamond wheel according to the practices of the prior art or it may be given an additional heating, either before or after it is mixed with the alkaline earth oxide catalyst to raise its melting point.

I will now describe specific methods of preparing the resin of my invention. It will be understood that the examples are for illustrative purposes only and not limitative.

*Example 1*

6 mols of phenol in the form of commercial phenol containing 90% $C_6H_5OH$ were reacted with 9 mols of formaldehyde in the form of aqueous formaldehyde containing 37% HCHO. Specifically, 626 grams of the phenol were admixed with 728 grams of the aqueous formaldehyde and to this mixture there was added 65.7 grams of commercial ammonium hydroxide containing 28% $NH_4OH$.

The reactants were put in a conventional reaction flask provided with a stirrer and thermometer and heated at such a rate as to raise the temperature from 40° C. to 75° C. in 1 hour. The heating was done by the use of a heating mantle and when the temperature had reached 75° C. the amount of heat applied was reduced so as to hold the reactants within the range of 75–85° C. They were kept at this temperature for 1½ hours at the end of which time a vacuum was applied while the amount of heat used was kept constant, the vacuum being of such extent as to bring the temperature down to 50° C. in 20 minutes. At that time the pressure on the flask was 85 millimeters.

The heat was then raised while the vacuum pump was kept running. The amount of vacuum applied was adjusted to keep the temperature at about 50° C. for about 3 hours at the end of which time the heat was increased so that after a total of 4 hours the temperature was 110° C., and the pressure was 20 millimeters of mercury. The resulting product was then poured from the flask and cooled. It was pulverized in a micro pulverizer and CaO in the amount of 1.25% based on the resin and MgO in the amount of .85% were added and thoroughly mixed into the resin. The resin had a melting point, as determined by the "Dennis Melting Point Bar" method, of 89° C. It was then heated at 150° F. for 6 hours and reground. At this stage the Dennis Bar melting point was 110° C.

*Example 2*

A resin was prepared from the reactants as in Example 1 but the procedure differed in the following respects:

The temperature was held at 75–80° C. for 50 minutes at which time two definite layers had formed. The water layer was then decanted and the water in the resin mixture was removed by applying a vacuum while maintaining the temperature at 70° C. This required approximately 4 hours. After grinding, adding the catalyst and heating for 1 hour at 170° F., the Dennis Bar melting point was 116° C.

An illustrative example of the production of a diamond wheel of the general character and made according to the process and with the apparatus of Ball et al. Patent 2,110,143 follows:

*Example 3*

A center or core for the wheel was made from a mixture of phenol-formaldehyde resin and powdered aluminum according to the procedure described in Van der Pyl Patent 2,150,886. The core was 8 inches in diameter and ½ inch thick and after it had been formed an abrasive mix was placed around the outside of the core as described in the Ball et al. patent. The mix for making the abrading portion, which was 1/16 inch thick, was as follows:

| Component: | Parts by weight |
| --- | --- |
| 80 grit diamonds | 14.29 |
| Pulverized flint | 55.71 |
| Powdered resin | 25.00 |
| Liquid resin | 5.00 |

The liquid resin was a conventional alkali-catalyzed liquid "A" stage phenol-formaldehyde condensation product having a viscosity at 25° C. of 350 centipoises sold by the Bakelite Corporation under the designation "BR-18251." The powdered flint was a pulverized flint sold under the trade name "Jasper." The powdered resin was a one-step resin catalyzed with a mixture of CaO and MgO and prepared according to the procedure of Example 1. The resin had the following physical characteristics:

| | |
| --- | --- |
| Flow in millimeters | 13 |
| Melting point, °C. (Dennis Bar) | 108 |
| Percent nitrogen, Kjeldahl | 1.57 |
| Percent ash | 1.27 |
| pH | 11.0 |

The ash consisted of 58% CaO and 42% MgO. The pH was determined on the extract obtained by stirring 5 grams of the resin in 20 cc. of distilled water and filtering.

The mix was prepared by first mixing together the diamonds and the flint, adding the liquid resin to this mixture and stirring until the liquid was well distributed over the granular material, and then adding the powdered resin and continuing mixing until the mass was substantially homogeneous. The mix was then spread in a tray in a layer ¼ inch thick, placed in an oven having a temperature of 250° F. for 7 minutes and after cooling was broken up to pass through a 20 mesh screen.

The wheel, which as stated was molded with the apparatus and according to the procedure of the Ball et al. Patent 2,110,143, was hot pressed for 20 minutes at 2000 pounds per square inch and was then removed from the mold and cured in an oven, the temperature of which was increased from 200° F. to 350° F. over a period of 15 hours and held at 350° F. for 16 hours.

One common measure of the concentration of diamonds in a diamond grinding wheel is to express it as the number of carats per cubic inch of abrading composition. Using the two-step resin of the prior art it has been customary to employ 54 carats per cubic inch, but I have found that a grinding wheel having substantially the same cutting rate and abrading life can be obtained by reducing the carat content to approximately one-half that amount. I have also found that for a given carat content the ratio of the amount of cemented tungsten carbide that is removed in a standard grinding test to the wheel loss during the test is greatly increased and in some instances is approximately doubled when the one-step alkaline earth catalyzed resin of my invention is substituted for the conventional two-step phenol-formaldehyde resin of the prior art.

In the specific examples I have described the use of CaO and MgO as the catalyst which is admixed with the powdered resin. I may, however, use the oxides or hydroxides of the other alkaline earths (barium or strontium) or mixtures of the alkaline earth oxides in place of the lime and magnesia. The catalyst should be used in proportions to provide a resin having a pH determined as described in Example 3, in the range of about 9.5–11.5.

I have also given a specific example in which the inert filler in the wheel was pulverized flint. I may substitute for this, in whole or in part, other fillers such as iron powder, fine clay, or 200 mesh lithium aluminum silicate such as that sold under the name "Stupolith." I have also found it desirable at times to incorporate in the wheel other granular material to supplement the diamonds, such as boron or silicon carbide.

The proportion of liquid resin used in making the moldable mix may be varied to obtain a mix having a satisfactory degree of dryness according to practices well known in the art of making resin bonded abrasive articles.

The specific examples recite certain relative amounts of ammonium hydroxide, phenol-formaldehyde, and alkaline earth oxide catalyst. It will be understood that these proportions may be varied within ranges well known in the art. For example, as has been stated, the ratio of phenol to formaldehyde may be varied within the range of about 1:1.1 to 1:1.7. The amount of alkaline earth oxide or mixture of oxides employed may be used in the range of about 1% to about 3% based on the weight of the resin.

The amount of commercial ammonium hydroxide (containing 28% $NH_4OH$) which is employed in the initial reaction may also be varied within the range of about 7–12% based on the weight of the phenol, which corresponds to about 2–3.5% $NH_4OH$. As stated, this catalyst may be a suitable nitrogen-containing base such as ammonia, ammonium hydroxide, or a substitution product of either thereof. Specific examples of such materials are methyl, dimethyl, and trimethyl amine (substituted ammonias) and tetraethyl ammonium hydroxide which is a quaternary ammonium base and a substitution product of ammonium hydroxide ($NH_4OH$). Other nitrogen-containing basic compounds commonly used in the preparation of phenol-formaldehyde resins such as ethylene diamine may also be substituted for the ammonium hydroxide or the amines specifically mentioned. Where other catalysts are used, the proportion should be such as to supply approximately the same amount of nitrogen in the initial reaction product as is derived from the 7–12% commercial ammonium hydroxide.

While I have illustrated my invention by specific examples and have described various alternatives which may be employed, other modifications of the compositions and procedures and other embodiments of the invention commonly used in the prior art may be practiced without departing from the spirit of the invention, the scope of which is defined in the appended claims.

I claim:

1. The method of making a resin-bonded diamond grinding wheel which comprises making a solid one-step "A" stage resin by reacting phenol and formaldehyde in the proportion of 1 mol phenol to about 1–1.7 mols formaldehyde in the presence of a nitrogen-containing base as a catalyst until a solid resin is formed; grinding the resin to a fine powder; preparing a moldable mixture comprising essentially the resin powder, granular filling material, diamonds, and an alkaline earth oxide catalyst for the powdered resin; forming an article from the mix thus prepared; and heating the article to convert the resin substantially to the "C" stage.

2. The method as claimed in claim 1 wherein the phenol and formaldehyde are initially reacted to a solid condition, the reaction product thus obtained is pulverized and mixed with the alkaline earth oxide catalyst, the mixture thus obtained is further heated to increase the softening point of the resin but not sufficiently to advance it beyond the "A" stage and is then ground, the diamonds and granular filling material are separately mixed and first wetted with a liquid resin and then with the pulverized resin-catalyst mixture, and the articles is formed from the last-mentioned mixture and heated to advance the resin substantially to the "C" stage.

3. A resin-bonded diamond grinding wheel made by the process of claim 1.

4. A resin-bonded diamond grinding wheel made by the process of claim 2.

5. The method as claimed in claim 1 wherein the nitrogen-containing catalyst is ammonium hydroxide and the alkaline earth catalyst is calcium oxide.

6. The method as claimed in claim 1 wherein the nitrogen-containing catalyst is an aqueous ammonia solution and is present in the range of about 2–3.5% $NH_4OH$ based on the weight of the phenol and the alkaline earth catalyst is a mixture of approximately 60% CaO and 40% MgO and is present in the range of about 1.8% to about 2.3% based on the weight of the resin.

References Cited in the file of this patent

UNITED STATES PATENTS

| | | |
|---|---|---|
| 2,150,886 | Der Pyl | Mar. 14, 1939 |
| 2,164,476 | Scutt | July 4, 1939 |
| 2,288,533 | Kreidl et al. | June 30, 1942 |
| 2,333,429 | Kuzmick | Nov. 2, 1943 |
| 2,424,787 | Adams | July 29, 1947 |